United States Patent
Shimokawa et al.

(10) Patent No.: US 9,665,285 B2
(45) Date of Patent: May 30, 2017

(54) DISK DEVICE AND METHOD FOR STORING DATA AND ASSOCIATED HEADERS

(71) Applicant: Kabushiki Kaisha Toshiba, Minato-ku, Tokyo (JP)

(72) Inventors: Hideo Shimokawa, Ome Tokyo (JP); Kenji Yoshida, Kamakura Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 18 days.

(21) Appl. No.: 14/731,451

(22) Filed: Jun. 5, 2015

(65) Prior Publication Data

US 2016/0266814 A1    Sep. 15, 2016

Related U.S. Application Data

(60) Provisional application No. 62/131,786, filed on Mar. 11, 2015.

(51) Int. Cl.
*G06F 3/06* (2006.01)

(52) U.S. Cl.
CPC ............ *G06F 3/0608* (2013.01); *G06F 3/064* (2013.01); *G06F 3/0674* (2013.01); *G06F 3/0676* (2013.01)

(58) Field of Classification Search
CPC ...... G06F 3/068; G06F 3/0674; G06F 3/0676; G06F 12/0866; G06F 3/0608; G06F 3/064
USPC ..................... 711/111–113; 710/68; 707/693
See application file for complete search history.

(56) References Cited

U.S. PATENT DOCUMENTS

| | | | |
|---|---|---|---|
| 5,623,701 A | 4/1997 | Bakke et al. | |
| 5,652,857 A | 7/1997 | Shimoi et al. | |
| 7,532,134 B2 * | 5/2009 | Samuels et al. | 341/87 |
| 8,230,139 B2 * | 7/2012 | Benveniste et al. | 710/33 |
| 8,433,823 B2 * | 4/2013 | Hugly et al. | 709/247 |
| 2002/0099907 A1 * | 7/2002 | Castelli et al. | 711/113 |

* cited by examiner

*Primary Examiner* — Than Nguyen
(74) *Attorney, Agent, or Firm* — White & Case LLP (57) ABSTRACT

According to one embodiment, a magnetic disk device includes a memory including a first storage area and a second storage area different from the first storage area, and a controller configured to generate a compressed data compressing input data, generate a header data related to a compressed data group including a plurality of compressed data, generate a packet data including the compressed data group and the header data, store the packet data in the first storage area, and store the header data in the second storage area.

20 Claims, 5 Drawing Sheets

DISK DEVICE AND METHOD FOR STORING DATA AND ASSOCIATED HEADERS

CROSS-REFERENCE TO RELATED APPLICATIONS

This application claims the benefit of U.S. Provisional Application No. 62/131,786, filed Mar. 11, 2015, the entire contents of which are incorporated herein by reference.

FIELD

Embodiments described herein relate generally to a magnetic disk device, a controller and a data management method.

BACKGROUND

Existing magnetic disk devices receive data from host systems with an approximately constant data size. Therefore, when data is sequentially stored in a buffer memory such as an SDRAM, an existing magnetic disk device easily searches for where in the buffer memory data is stored based on the initial address of the stored data.

Currently, a magnetic disk device having a compression circuit related to be stored data is considered. In the magnetic disk device having the compression circuit, as the compression ratio differs depending on the data type, the data size may vary according to the compressed data. Therefore, when compressed data is sequentially stored in the buffer memory of the magnetic disk device, it is difficult to search for where compressed data is stored.

DETAILED DESCRIPTION

In general, according to one embodiment, a magnetic disk device comprises: a memory comprising a first storage area and a second storage area different from the first storage area; and a controller configured to generate a compressed data compressing input data, generate a header data related to a compressed data group including a plurality of compressed data, generate a packet data including the compressed data group and the header data, store the packet data in the first storage area, and store the header data in the second storage area.

Embodiments will be described hereinafter with reference to the accompanying drawings.

(First Embodiment)

Figure 1:
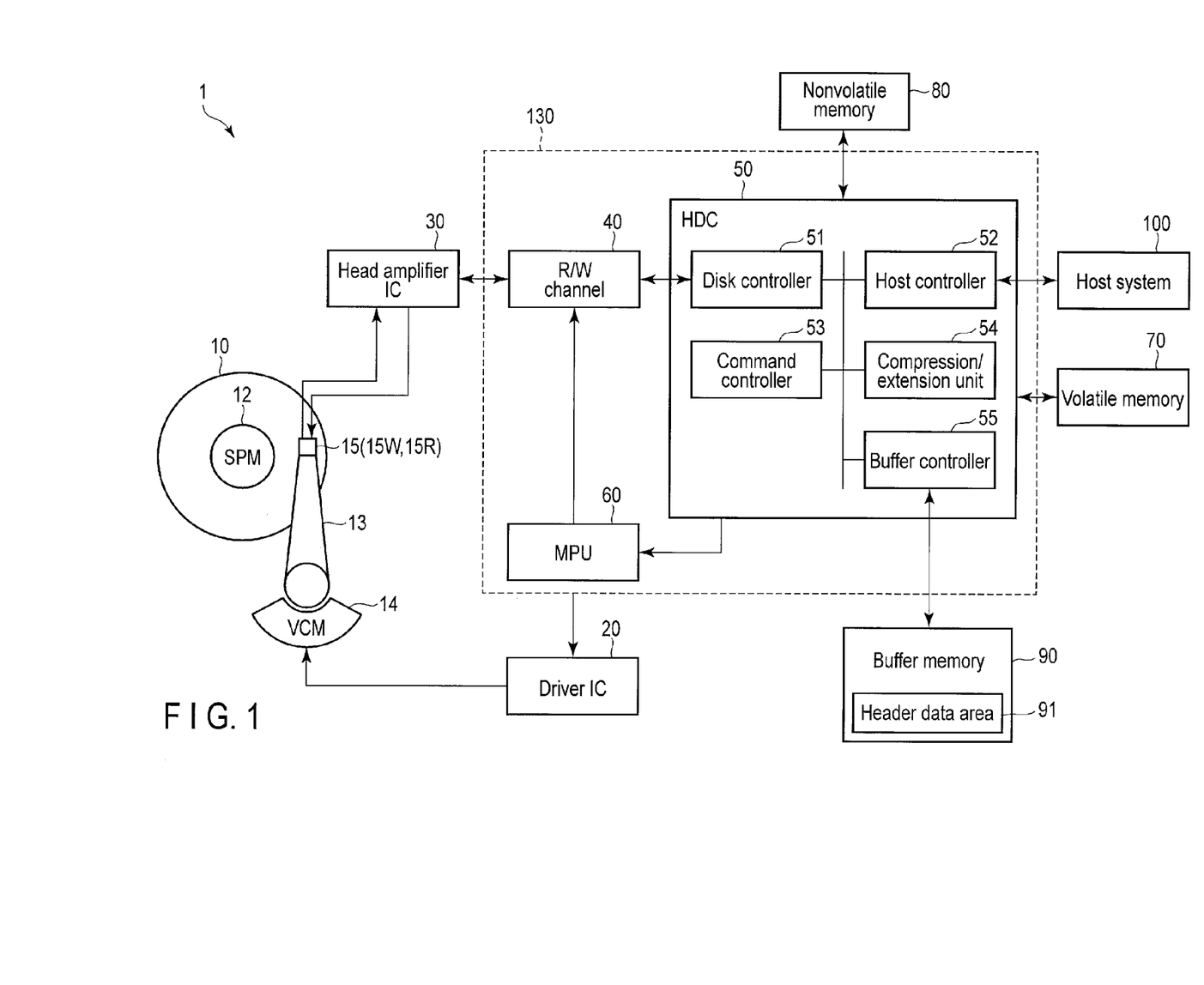
FIG. 1 is a block diagram showing a configuration of a magnetic disk device according to a first embodiment.

FIG. 1 is a block diagram showing a configuration of a magnetic disk device according to a present embodiment.

The magnetic disk device 1 includes a head-disk assembly (HDA) which is described later, a driver IC 20, a head amplifier integrated circuit (IC) 30, a volatile memory 70, a nonvolatile memory 80, a buffer memory (a memory) 90 and a system controller 130 of a one-chip integrated circuit. The magnetic disk device 1 is connected to a host system (a host) 100.

The HDA includes a magnetic disk (a disk) 10, a spindle motor (SPM) 12, an arm 13 having a head 15, and a voice coil motor (VCM) 14. The disk 10 is rotated by the SPM 12. The arm 13 and the VCM 14 are structured an actuator. The actuator drives the VCM 14 and controls the head 15 mounted on the arm 13 such that the head 15 moves to a specified position on the disk 10. The number of disks 10 is one or more. The number of heads 15 is also one or more.

The head 15 includes a slider as a main body, a write head 15W and a read head 15R. The write head 15W and the read head 15R are mounted on the slider. The read head 15R reads data (data item) recorded on a data track of the disk 10. The write head 15W writes data onto the disk 10.

The driver IC 20 controls the driving of the SPM 12 and the VCM 14.

The head amplifier IC 30 includes a read amplifier and a write driver. The read amplifier amplifies a read signal read by the read head 15R and transmits the signal to a read/write (R/W) channel 40. The write driver transmits, to the write head 15W, a write current based on write data output from the R/W channel 40.

The volatile memory 70 is a semiconductor memory from which the stored data is lost when power supply is stopped. The volatile memory 70 stores, for example, data necessary for a process in each unit of the magnetic disk device 1. The volatile memory 70 is, for example, a synchronous dynamic random access memory (SDRAM).

The nonvolatile memory 80 is a semiconductor memory which retains stored data even when power supply is stopped. The nonvolatile memory 80 is, for example, a flash read-only memory (ROM).

The buffer memory 90 is a semiconductor memory which temporarily retains, for example, data transferred between the disk 10 and the host system 100. The buffer memory 90 stores data compressed by a compression/extension unit 54 which is described later. The buffer memory 90 includes a header data area 91 for storing header data (hereinafter, which may be simply referred to as a header). Header data includes data related to data compressed by the compression/extension unit 54 which is described later. The header data area 91 is a storage area which is different from a storage area for storing data transferred from each unit in the buffer memory 90. The buffer memory 90 may be integrally provided with the volatile memory 70. The buffer memory 90 is, for example, a dynamic random access memory (DRAM), a synchronous dynamic random access memory (SDRAM), a ferroelectric random access memory (FeRAM) or a magnetoresistive random access memory (MRAM).

The system controller 130 includes the R/W channel 40, a hard disk controller (HDC) (a controller) 50 and a microprocessor (MPU) 60.

The R/W channel 40 processes signals of read data and write data.

The HDC 50 controls data transfer between the host system 100 and the R/W channel 40 in accordance with an instruction from the MPU 60.

The HDC 50 includes a disk controller 51, a host controller 52, a command controller 53, the compression/extension unit 54 and a buffer controller 55. In the present embodiment, these units are connected via a bus, etc., in the HDC 50.

The disk controller 51 is connected to the R/W channel 40 and controls the disk 10.

The host controller 52 controls data transfer relative to the host system 100.

The command controller 53 controls a write command or a read command received from the host system 100.

The compression/extension unit 54 compresses and extends data. The compression/extension unit 54 generates data (compressed data) prepared by compressing data (input data) transferred via the host controller 52. The compression/extension unit 54 transfers compressed data to the buffer memory 90 via the buffer controller 55. The compression/extension unit 54 receives compressed data from the buffer memory 90 via the buffer controller 55 and extends the received data so as to have the data size before compression. Extended data may be referred to as extended data items E1, E2, E3, . . . , En. Extended data items E1 to En may be collectively referred to as extended data items E(1:n).

The compression/extension unit 54 transfers extended data to the host system 100 via the host controller 52. The compression/extension unit 54 is explained in detail later.

The buffer controller 55 is connected to the buffer memory 90 and controls data transferred relative to the buffer memory 90. For example, the buffer controller 55 temporarily stores, in the buffer memory 90, data read from the disk 10 or data to be written to the disk 10 in accordance with an instruction from the MPU 60.

The MPU 60 is a main controller which controls each unit of the magnetic disk device 1. The MPU 60 controls the VCM 14 via the driver IC 20 and executes servo control for determining the position of the head 15. Further, the MPU 60 controls the operation for writing data to the disk 10 and controls the operation for selecting the destination in which write data transferred from the host system 100 is stored.

(Method for Managing Data Transferred from Host System)

Figure 2:
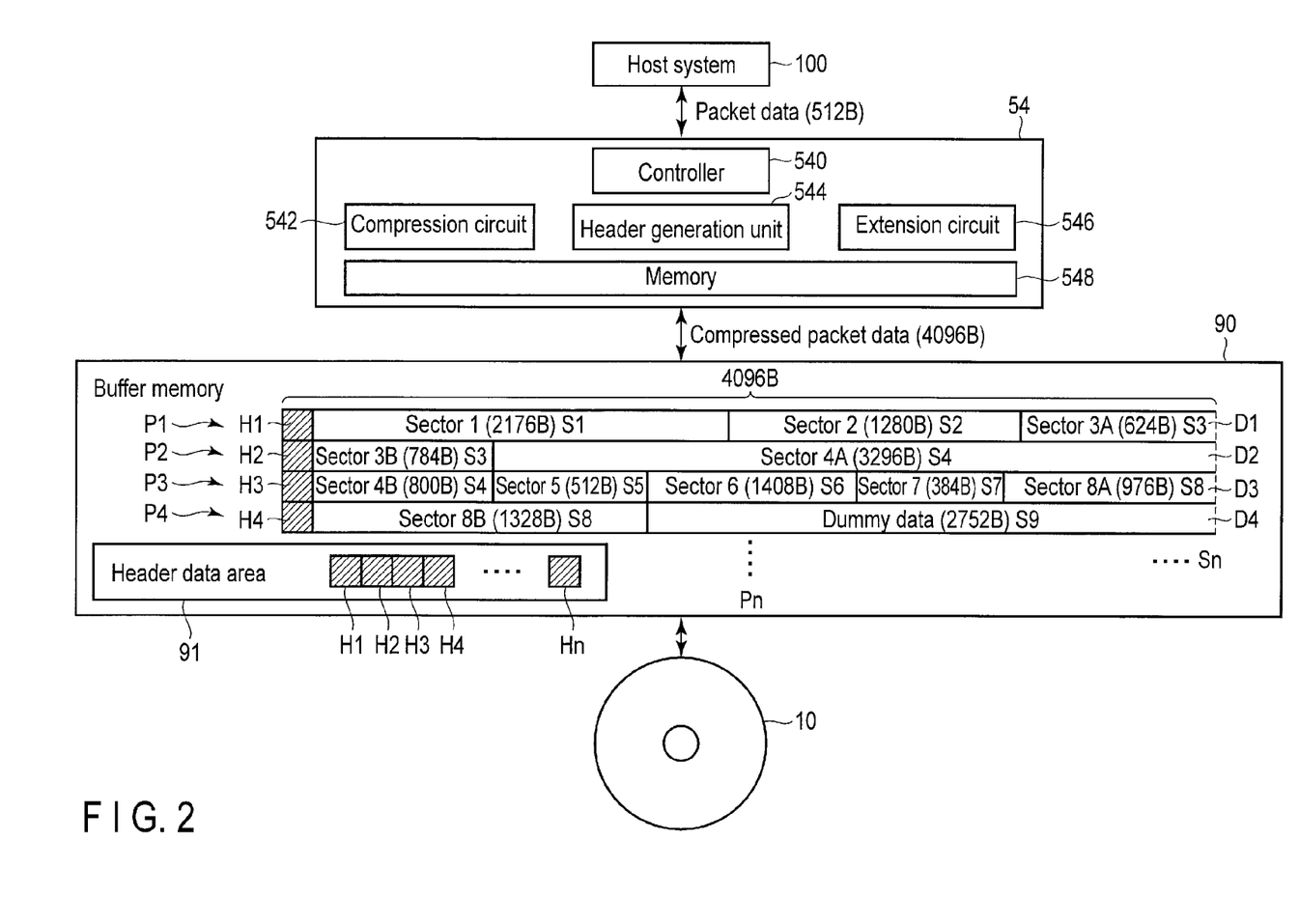
FIG. 2 shows an outline of a data management method according to the first embodiment.

FIG. 2 shows an outline of a method for managing data according to the present embodiment.

As shown in FIG. 2, the compression/extension unit 54 includes a controller 540, a compression circuit (a compression unit) 542, a header generation unit (a generation unit) 544, an extension circuit (an extension unit) 546 and a memory 548.

The controller 540 controls each unit of the compression/extension unit 54. The compression circuit 542 compresses data with a particular compression ratio. The header generation unit 544 generates a header related to data compressed by the compression circuit 542. The extension circuit 546 extends compressed data. The memory 548 retains data related to a process in the compressive circuit 542 or the extension circuit 546. In the descriptions below, there is a case where data is not compressed depending on the compression ratio (in short, there is a case of uncompressed data). However, for convenience sake, the term "compressed data" may include uncompressed data. In addition, a single compressed data may be called a sector in the following descriptions.

The compression/extension unit 54 (controller 540) loads, to the compression circuit 542, packet data (transfer data) transferred with a particular data size unit from the host system 100 until the packet data size reaches a particular data size. In the present embodiment, the particular data size in transfer from the host 100 to the compression/extension unit 54 is set to 512 bytes (B), and the particular data size in transfer from the compression/extension unit 54 to the disk 10 via the buffer memory 90 is set to 4096 bytes.

The compression circuit 542 generates compressed data by compressing packet data which was loaded and reached the particular data size. In the compression circuit 542, the compression ratio of data differs depending on the type of data (for example, moving image data, image data and audio data) transferred from the host system 100. For example, the particular data size in compression executed by the compression circuit 542 is 4096 bytes. In this case, compressed data includes 8 packet data items each being a packet data (512 bytes) transferred from the host system 100.

Now, this specification explains examples of processes executed in the compression circuit 542 to compress different types of packet data.

For example, as shown in FIG. 2, each of moving image data, image data and audio data is transferred from the host system 100 with a unit of 512 bytes. When the data size of each data type reaches 4096 bytes, the compression circuit 542 compresses the data. For example, in a case of moving image data, the compression circuit 542 compresses 4096 bytes of moving image data into 1280 bytes and outputs the data. For example, in a case of audio data, the compression circuit 542 compresses 4096 bytes of audio data into 384 bytes and outputs the data. Assuming that image data is not compressed (in short, uncompressed data) because the compression ratio is low, the compression circuit 542 outputs 4096 bytes of image data with the data size of 4096 bytes.

In accordance with generation of compressed data by the compression circuit 542, the header generation unit 544 generates a header including data related to the generated compressed data. In the present embodiment, the data size of a header is set to 16 bytes as an example.

The compression/extension unit 54 (controller 540) stores the generated compressed data and header in the memory 548. The compression/extension unit 54 connects a compressed data group including at least one compressed data (or a part of a compressed data) to a header related to the compressed data group and generates a compressed packet data (compressed packet) having a particular data size. At this time, the compression/extension unit 54 connects the header to the top of the compressed data group. The compression/extension unit 54 transfers the generated compressed packet to the buffer memory 90. In the above explanation, the header is connected to the top of the compressed data group. However, the compression/extension unit 54 may connect the header to the end of the compressed data group.

When the data size of the compressed packet does not conform to the particular data size (for example, 4096 bytes), the compression/extension unit 54 (controller 540) adjusts the data size of the compressed data group included in the compressed packet stored in the memory 548 so as to be the particular data size (for example, 4096 bytes), and transfers the adjusted data to the buffer memory 90.

For example, when the data size of the compressed packet is smaller than 4096 bytes, the compression/extension unit 54 adjusts the data size so as to be 4096 bytes by connecting dummy (invalid) data to the end of the compressed data group. The dummy data is data generated to conform the data size of the compressed packet to the particular data size.

For example, when the data size of the compressed packet is larger than 4096 bytes due to the data size of the compressed data group, the compression/extension unit 54 adjusts the data size of the compressed packet so as to be 4096 bytes by dividing the compressed data connected to the end of the compressed data group. Hereinafter, each of compressed data items generated by dividing a compressed data (sector) into two or more data items is called a divided data.

For example, there is a case where the compressed data at the end is divided into the first half data as a first divided data and the latter half data as a second divided data. In this case, the compression/extension unit 54 stores the first divided data in the memory 548 as a compressed data located at the end of the compressed data group included in the compressed packet (a first compressed packet). The compression/extension unit 54 stores the second divided data in the memory 548 as a compressed data located at the top of the compressed data group included in the next compressed packet (a second compressed packet). At this time, the compression/extension unit 54 transmits the compressed packet (first compressed packet) which reached the particular data size and includes the first divided data to the buffer memory 90. The compression/extension unit 54 generates information (information piece) (a flag) indicating that a compressed data was divided, and inserts the information into the header portion of the second compressed packet.

In the present embodiment, the buffer controller 55 stores compressed packets transferred from the compression/extension unit 54 in the buffer memory 90 in a particular order. At this time, separately from the transferred compressed packets, the buffer controller 55 stores the header of each compressed packet in the buffer memory 90 based on the order of the compressed packets transferred from the compression/extension unit 54 (hereinafter, referred to as a transfer order).

The buffer memory 90 stores the compressed packets transferred from the compression/extension unit 54. Separately from the compressed packets, the buffer memory 90 stores the transferred headers in the header data area 91. The buffer memory 90 arranges and stores the headers in accordance with the transfer order of the compressed packets.

For example, as shown in FIG. 2, the buffer memory 90 stores compressed packets P1, P2, P3, P4, . . . , Pn and stores headers H1, H2, H3, H4, . . . , Hn in the header data area 91. Compressed packets P1 to Pn may be collectively referred to as compressed packets P(1:n). Compressed data groups D1 to Dn may be collectively referred to as compressed data groups D(1:n). Compressed data items (sectors) S1 to Sn may be collectively referred to as sectors S(1:n). Headers H1 to Hn may be collectively referred to as headers H(1:n).

Now, this specification explains an example of a method for storing compressed data in the buffer memory 90 with reference to compressed packets P1 to P4 and headers H1 to H4 shown in FIG. 2.

As shown in FIG. 2, the buffer memory 90 stores compressed packets P1 to P4 in accordance with the transfer order from the compression/extension unit 54. In the buffer memory 90 shown in FIG. 2, compressed packet P1 is firstly stored. After compressed packet P1, compressed packet P2 is stored. After compressed packet P2, compressed packet P3 is stored. After compressed packet P3, compressed packet P4 is stored.

Compressed packet P1 includes header H1 and compressed data group D1 (sector 1 [2176 bytes] S1, sector 2 [1280 bytes] S2 and sector 3A [624 bytes] S3). Compressed packet P2 includes header H2 and compressed data group D2 (sector 3B [784 bytes] S3 and sector 4A [3296 bytes] S4). Compressed packet P3 includes header H3 and compressed data group D3 (sector 4B [800 bytes] S4, sector 5 [512 bytes] S5, sector 6 [1408 bytes] S6, sector 7 [384 bytes] S7 and sector 8A [976 bytes] S8). Compressed packet P4 includes header H4 and compressed data group D4 (sector 8B [1328 bytes] S8 and dummy data [2752 bytes] S9). Sector 3A (S3) and sector 3B (S3) constitute one sector. Sector 4A (S4) and sector 4B (S4) constitute one sector. Sector 8A (S8) and sector 8B (S8) constitute one sector. Thus, sector 3 (1408 bytes) S3 includes sector 3A (624 bytes) S3 and sector 3B (784 bytes) S3. Sector 4 (4096 bytes) S4 includes sector 4A (3296 bytes) S4 and sector 4B (800 bytes) S4. Sector 8 (2304 bytes) S8 includes sector 8A (976 bytes) S8 and sector 8B (1328 bytes) S8.

As shown in FIG. 2, the buffer memory 90 stores headers H1 to H4 in the header data area 91 in accordance with the transfer order (or storage order) of compressed packets P1 to P4.

In the header data area 91 shown in FIG. 2, header H1 related to compressed packet P1 is firstly stored. After header H1, header H2 related to compressed packet P2 is stored. After header H2, header H3 related to compressed packet P3 is stored. After header H3, header H4 related to compressed packet P4 is stored.

Here, each header H(1:n) includes at least one of four information pieces: a first header information to a fourth header information.

The first header information indicates the number of sequential compressed data items included in a compressed packet from the top compressed data (top data). The top data does not include a divided data. Specifically, the first header information indicates how many data items (sectors) which were compressed with a compression ratio so as to have a data size smaller than data obtained from the host system 100 are sequentially arranged from the top data in compressed data group Dn.

In the first header information, the divided data connected to the end of a compressed packet is counted as a compressed data. However, the divided data allocated before the top data of a compressed packet is not counted as a compressed data. In the first header information, an uncompressed data is not counted as a compressed data.

The first header information may include information indicating the number of compressed data items included in a compressed packet.

The first header information may include information indicating that each sector is a compressed data or an uncompressed data.

The first header information may include information indicating whether or not each sector included in a compressed packet includes valid data (in other words, whether or not each sector included in a compressed packet is dummy data).

The second header information indicates the start position of the top data of a compressed packet. For example, the second header information indicates the start position of the top data by the data size. If a divided data (compressed or uncompressed data) is present before the top data, the second header information does not indicate the start position of the divided data, but indicates the start position of the top data. In other words, if a divided data is present before the top data, the second header information indicates a value other than "0".

The third header information is information (a flag) indicating whether or not a divided data is present before the top data in a compressed packet. For example, if a divided data (compressed or uncompressed data) is present before the top data, the third header information is indicated by "1". If no divided data is present between the top data items, the third header information is indicated by "0".

The fourth header information specifies the LBA number (sector number) of the top data in a compressed packet. Here, the fourth header information is explained as information indicating the LBA number. However, the fourth header information may be information of the management number added to each compressed data. The management number may be managed as a number different from the LBA or may be managed as a number associated with the LBA of each compressed data. For example, management numbers are managed as sequential numbers added to compressed data items in the generation order.

Since headers H(1:n) are sequentially stored in the header data area 91, the HDC 50 can refer to a plurality of headers by a single access. By referring to these first to fourth header information pieces included in each header H(1:n), the HDC 50 can manage the arrangement of sectors S(1:n) in each compressed packet P(1:n).

Now, this specification explains an example of management which refers to these first to fourth header information pieces according to the present embodiment.

When the first header information is referred to, the HDC 50 can determine the number of sequential compressed data items (sectors) from the top data in each compressed packet P(1:n). For example, in FIG. 2, when the first header information of compressed packet P1 is referred to, the HDC 50 determines that the number of sequential compressed data items is "3". For example, in FIG. 2, when the first header information of compressed packet P3 is referred to, the HDC 50 determines that the number of sequential compressed data items is "4". In the first header information of compressed packet P3, sector 4B (S4) which is an uncompressed data and a divided data is not counted as a compressed data. Sector 8A (S8) which is a divided data connected to the end is counted as a compressed data.

When the first header information includes information indicating the number of compressed data items included in each compressed packet P(1:n), the HDC 50 can determine the number of compressed data items (sectors S(1:n)) included in each compressed packet P(1:n) with reference to the first header information. For example, when the first header information includes the number of compressed data items shown by the bit number, the HDC 50 determines the number of compressed data items (sectors S(1:n)) included in each compressed packet P(1:n) based on the bit number included in the first header information.

When the first header information includes information indicating that each compressed data (sector S(1:n)) included in each compressed packet P(1:n) is a compressed data or an uncompressed data, the HDC 50 can determine that each compressed data (sector S(1:n)) included in each compressed packet P(1:n) is a compressed data or an uncompressed data with reference to the first header information. For example, in FIG. 2, the HDC 50 can determine that the data connected to sector 3B is an uncompressed data with reference to the first header information of compressed packet P2.

When the first header information includes information indicating whether or not each sector included in a compressed packet includes valid data, the HDC 50 can determine whether or not each sector is dummy data with reference to the first header information. For example, in FIG. 2, the HDC 50 can determine that the data connected to sector 8B has no data (in other words, the data is dummy data) with reference to the first header information of compressed packet P4.

When the second header information is referred to, the HDC 50 can obtain information indicating the start position of the top data of each compressed packet P(1:n). In other words, the HDC 50 can obtain the data size of the sector before the top data of each compressed packet P(1:n). For example, in FIG. 2, when the second header information of compressed packet P1 is referred to, the HDC 50 obtains "0 bytes" as the data size of the start position of the top data (sector 1 (S1)). For example, in FIG. 2, when the second header information of compressed packet P3 is referred to, the HDC 50 obtains "800 bytes" as the data size of the start position of the top data (sector 5(S5)). When uncompressed data ranges over three compressed packets, no top data is included in the second compressed packet. Therefore, when the second header information of the second compressed packet is referred to, an invalid value is obtained.

When the third header information is referred to, the HDC 50 can determine whether or not a divided data is present before the top data of each compressed packet P(1:n). For example, the HDC 50 determines that a divided data is present before the top data when "1" is obtained with reference to the third header information. The HDC 50 determines that no divided data is present before the top data when "0" is obtained with reference to the third header information.

When the fourth header information is referred to, the HDC 50 can obtain the LBA number of the top data of each compressed packet P(1:n). Thus, when the fourth header information is referred to, the HDC 50 can determine the data (packet data) which is included in the top data of each compressed packet P(1:n) and is transferred from the host system 100. For example, when the data size of a packet data transferred from the host system 100 is 512 bytes, and 4096 bytes of a packet data group is compressed to prepare a compressed data, eight packet data items are included in the compressed data. In other words, a compressed data includes eight packet data items having their respective LBA numbers. When the LBA number of the top data is "500", the HDC 50 can determine that the top data includes packet data items to which the LBA numbers "500" to "507" are added, respectively.

Thus, with reference to some of these first to fourth header information pieces of some compressed packets, the HDC 50 can determine the data structure of each compressed packet P(1:n).

For example, the HDC 50 refers to the first header information and determines that the number of sequential compressed data items in the target compressed packet (hereinafter, referred to as the current compressed packet) is two. After referring to the first header information, the HDC 50 presumes, as the data structure of the compressed packet, a case where two sectors of compressed data items are stored in the compressed packet, a case where the second sector of compressed data items is a divided data and a case where an uncompressed data is connected after two sectors of compressed data items.

At this time, for example, the HDC 50 refers to the first header information of the current compressed packet and the second header information or the third header information of the compressed packet (hereinafter, referred to as the next compressed packet) stored after the current compressed packet and can determine that just two sectors of compressed data items are stored in the compressed packet. In this case, for example, the second header information of the next compressed packet indicates "0 bytes", and the third header information of the next compressed packet also indicates "0".

For example, the HDC 50 refers to the first header information of the current compressed packet and the second or third header information of the next compressed packet and can determine that the second sector of compressed data items is a divided data. In this case, for example, the second header information of the next compressed packet indicates a value other than "0 bytes", and the third header information of the next compressed packet indicates "1".

For example, the HDC 50 refers to the first and fourth header information pieces of the current and next compressed packets and can determine whether or not an uncompressed data is connected after two sectors of compressed data items. In this case, the HDC 50 obtains the number of compressed data items and the LBA numbers of the top data items in the current and next compressed packets with reference to these first and fourth header information pieces of the current and next compressed packets. The HDC 50 determines whether or not an uncompressed data is connected after two sectors of compressed data items based on the obtained number of compressed data items and LBA numbers of the top data items.

Here, this specification assumes that the LBA number of the top data of the current compressed packet (in short, the fourth header information) is "500". In this case, the HDC 50 determines that the LBA number of the compressed data connected to the end of the current compressed packet is "516" based on the fourth header information since the HDC 50 has obtained information indicating that the number of sequential compressed data items is two based on the first header information. Subsequently, the HDC 50 determines that the LBA number of the top data is "532" based on the fourth header information of the next compressed packet. The HDC 50 estimates that the LBA number of the top data of the next compressed packet is "524" based on the LBA number "516" of the last compressed data of the current compressed packet. Further, the HDC 50 compares the estimated LBA number "524" of the top data of the next compressed packet to the LBA number "532" of the top data determined with reference to the fourth header information of the next compressed packet. When the estimated LBA number does not conform to the LBA number determined with reference to the fourth header information, the HDC 50 determines that an uncompressed data is connected to the end of the current compressed packet.

When the estimated LBA number conforms to the LBA number determined with reference to the fourth header information, the HDC 50 can estimate that a compressed data or a divided data is connected to the end of the current compressed packet. At this time, the HDC 50 can further determine whether the data is a compressed data or a divided data with reference to the second header information and the third header information.

For example, when the first header information is information indicating whether each sector included in a compressed packet is a compressed data or an uncompressed data, the HDC 50 can determine whether or not an uncompressed data is connected after two sectors of compressed data items with reference to the first header information of the current compressed packet.

As explained in the above example, data is managed with reference to these first to fourth header information pieces.

As shown in FIG. 1 and FIG. 2, the HDC 50 writes compressed packets P(1:n) to which headers H(1:n) are added, respectively, to the disk 10 via the disk controller 51. In this case, the HDC 50 does not write headers H(1:n) of the header data area 91 to the disk 10, and writes only compressed packets P(1:n).

After writing compressed packets P(1:n) to the disk 10, the HDC 50 processes headers related to the compressed packets written to the disk 10 as invalid data (in other words, the HDC 50 invalidates the headers). At this time, these headers become erasable.

(Method for Managing Data Read from Disk)

As stated above, when compressed packets P(1:n) added headers H(1:n) are written to the disk 10, the HDC 50 reads compressed packets P(1:n) from the disk 10 via the disk controller 51. The HDC 50 stores the read compressed packets P(1:n) in the buffer memory 90 via the buffer controller 55. In association with the storage of compressed packets P(1:n) in the buffer memory 90, the HDC 50 copies headers H(1:n) added to compressed packets P(1:n) to the header data area 91 at a particular timing.

The HDC 50 reads headers H(1:n) stored in the header data area 91 from the buffer memory 90 and obtains data of sectors S(1:n) included in each compressed packet P(1:n). Based on the obtained data, the HDC 50 reads the compressed packet P(1:n) including the sector to be extended from the buffer memory 90 and stores the read compressed packet P(1:n) in the memory 548.

By using the extension circuit 546, the HDC 50 reads compressed packets P(1:n) from the memory 548, refers to data of headers H(1:n) which are stored in the header data area 91 and are related to compressed packets P(1:n), extends each sector S(1:n) included in compressed packets P(1:n) into the data size before compression and generates extended data items E(1:n). The HDC 50 may refer to data of headers H(1:n) added to compressed packets P(1:n), extend each sector S(1:n) included in compressed packets P(1:n) into the data size before compression and generate extended data items E(1:n).

When the HDC 50 determines that a divided data is included in the compressed packet to be extended, the HDC 50 may search for a compressed packet including the other divided data included in the sector with reference to headers H(1:n) stored in the header data area 91.

For example, the HDC 50 determines that a divided data (the first divided data) is included in a compressed packet with reference to header information (for example, the first and second header information pieces). In this case, the HDC 50 obtains a compressed packet including the other divided data (for example, the second divided data) included in the sector from the buffer memory 90.

The HDC 50 passes the first-half divided data (for example, the first divided data) and the latter-half divided data (for example, the second divided data) to the extension circuit 546 and extends the two divided data items as one sector into the data size before compression.

If the HDC 50 determines that a divided data is present before the top data with reference to the second and third header information pieces, the HDC 50 may begin with extension of the top data by discarding or postponing extension of the divided data.

Each of the extended data items (extended data items E(1:n)) can be transferred to the host system 100 with a particular data size unit.

The HDC 50 processes, as invalid data, all headers H(1:n) which are related to compressed packets P(1:n) before extension of extended data items E(1:n) transferable to the host system 100 and are stored in the header data area 91 and the memory 548. At this time, the HDC 50 may delete headers (1:n) processed as invalid data.

Figure 3:
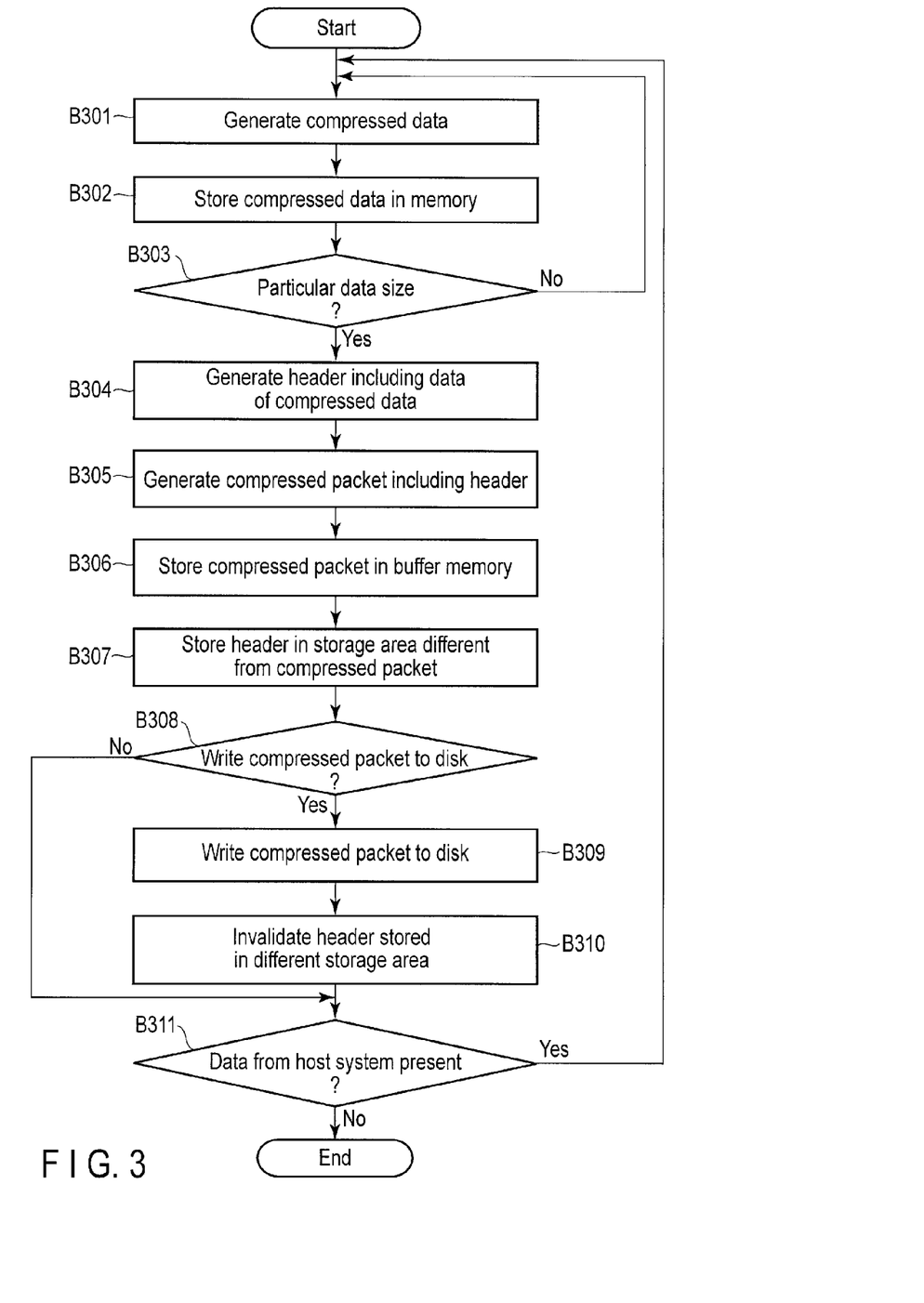
FIG. 3 is a flowchart of a method for managing data transferred from a host system according to the first embodiment.

FIG. 3 is a flowchart showing a method for managing data transferred from the host system according to the present embodiment.

The HDC 50 of the present embodiment receives data transferred from the host system 100.

In B301, the HDC 50 obtains data transferred from the host system 100 until the data size reaches a particular data size (a first data size; for example, 4096 bytes). The HDC 50 compresses the obtained data having the particular data size and generates compressed data Sk. Here, $1 \leq k \leq n$.

In B302, the HDC 50 stores compressed data Sk generated in B301 in the memory 548.

In B303, the HDC 50 determines whether or not the data size of compressed data group Dk including compressed data Sk stored in the memory 548 of the compression/extension unit 54 is a particular data size (a second data size). The second data size is, for example, the difference value (for example, 4080 bytes) between the first data size (for example, 4096 bytes) and the header data size (for example, 16 bytes).

When the HDC 50 determines that the data size is not the second data size (NO in B303), the HDC 50 returns to the step of B301, compresses data which has the first data size and is compressed after compressed data Sk compressed immediately before, generates compressed data (B301), and stores the generated compressed data Sk+1 in the memory 548 (B302).

When the HDC 50 determines that the data size is the second data size (YES in B303), in B304, the HDC 50 generates, relative to the generated compressed data group Dk, header Hk including data of sectors S(k:k+m) (here, m is an arbitrary integer) included in compressed data group Dk by using the header generation unit 544 of the compression/extension unit 54.

In B305, the HDC 50 connects header Hk to compressed data group Dk and generates compressed packet Pk including header Hk.

In B306, the HDC 50 stores the generated compressed packet Pk in the buffer memory 90.

In B307, separately from header Hk added to compressed packet Pk, the HDC 50 stores header Hk in a storage area (header data area 91) different from the storage area in which compressed part Pk is stored.

In B308, the HDC 50 determines whether or not compressed packet Pk stored in the buffer memory 90 should be written to the disk. When the HDC 50 determines that compressed packet Pk should be written to the disk (YES in B308), the HDC 50 writes compressed packet Pk to the disk 10 in B309.

In B310, the HDC 50 invalidates header Hk which is stored in the header data area 91 and is related to compressed packet Pk written to the disk 10. Subsequently, the HDC 50 proceeds to the step of B311.

When the HDC 50 determines that compressed packet Pk should not be written to the disk 10 (NO in B308), the HDC 50 proceeds to the step of B311.

In B311, the HDC 50 determines whether or not data is transferred from the host system 100. When the HDC 50 determines that data is transferred from the host system 100 (YES in B311), the HDC 50 returns to the step of B301.

When the HDC 50 determines that data is not transferred from the host system 100 (NO in B311), the HDC 50 terminates the process.

The steps of the method for managing compressed data in the HDC 50 are not limited to those of the flowchart shown in FIG. 3.

For example, the HDC 50 determines whether or not data is transferred from the host system 100 after a compressed packet and a header are stored in the buffer memory 90. When the HDC 50 determines that data is transferred, the HDC 50 repeats the steps from generation of compressed data (for example, the step of B301 in FIG. 3) to storage in the buffer memory 90 (for example, the step of B307 in FIG. 3) and the step of determination regarding whether or not data is transferred from the host system (for example, the step of B311 in FIG. 3). When the HDC 50 determines that data is not transferred from the host system 100, the HDC 50 determines whether or not the compressed packet of the buffer memory 90 should be written to the disk 10 (for example, B308 in FIG. 3). Compressed data may be managed in accordance with these steps.

Figure 4:
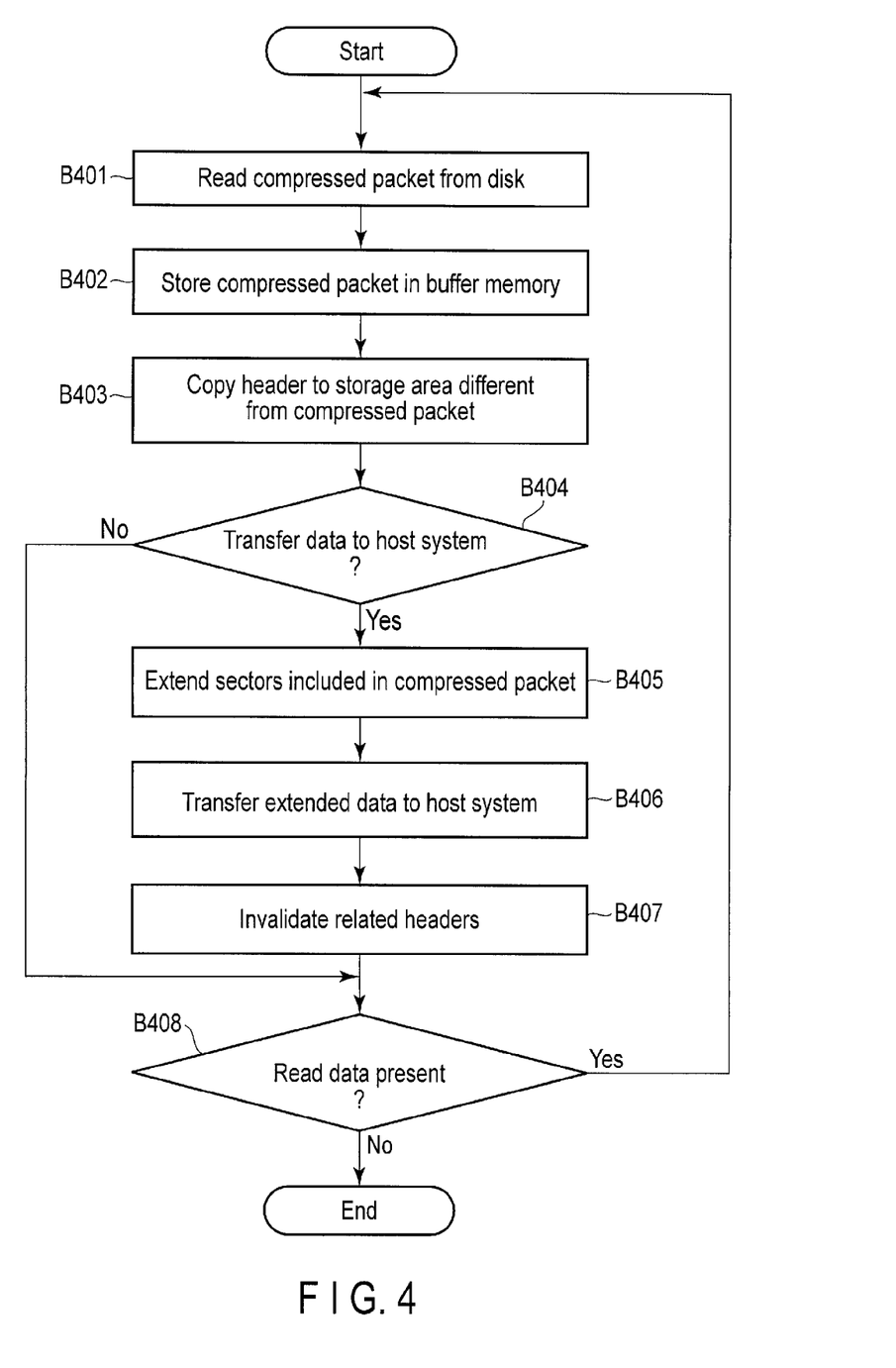
FIG. 4 is a flowchart of a method for managing data read from a disk according to the first embodiment.

FIG. 4 is a flowchart showing a method for managing data read from the disk according to the present embodiment. In FIG. 4, compressed packet Pk has been written to the disk 10. Here, $1 \leq k \leq n$.

In B401, the HDC 50 reads compressed packet Pk from the disk.

In B402, the HDC 50 stores the read compressed packet Pk in the buffer memory 90.

In B403, the HDC 50 copies header Hk added to compressed packet Pk to a storage area (header data area 91) different from the storage area in which compressed packet Pk is stored at a particular timing.

In B404, the HDC 50 determines whether or not extended data Ek should be transferred from the buffer memory 90 to the host system 100.

When the HDC 50 determines that data should be transferred to the host system 100 (YES in B404), in B405, the HDC 50 obtains compressed packet Pk from the buffer memory 90 and header Hk from the header data area 91, extends sectors (k:k+m) included in compressed packet Pk, generates extended data E(k:k+m) and proceeds to the step of B406. The HDC 50 may obtain compressed packet Pk from the buffer memory 90, refer to header Hk added to the obtained compressed packet Pk, extend sectors S(k:k+m) and generate extended data E(k:k+m).

In B406, the HDC 50 transfers the obtained extended data Ek to the host system 100.

In B407, the HDC 50 invalidates all headers Hk related to extended data Ek transferred to the host system 100.

When the HDC 50 determines that data should not be transferred to the host system 100 (NO in B404), the HDC 50 proceeds to the step of B408.

In B408, the HDC 50 determines whether or not data to be read (read data) from the disk 10 is present. When the HDC 50 determines that read data is present (YES in B408), the HDC 50 returns to the step of B401.

When the HDC 50 determines that no read data is present (NO in B408), the HDC 50 terminates the process.

According to the present embodiment, the HDC 50 generates a header related to data compressed by the compression/extension unit 54. The HDC 50 stores, in the buffer memory 90, a compressed packet which has a particular data size. The compressed packet includes: a compressed data group including at least one compressed data; and a header related to the compressed data group. At this time, separately from compressed packets P(1:n), the HDC 50 stores headers H(1:n) in the header data area 91 which is a storage area different from the area in which the compressed packets are stored in the buffer memory 90. The HDC 50 can read a plurality of headers H(1:n) related to a plurality of compressed packets P(1:n) by a single access to the header data area 91. As a result, the HDC 50 can effectively manage compressed data which differs in the data size depending on the sector.

In the above embodiment, an example of the configuration of the magnetic disk device 1 is shown. However, as shown in FIG. 2, the magnetic disk device 1 has only to include the compression/extension unit 54, the buffer memory 90 and the disk 10. At this time, the buffer memory 90 and the disk 10 may be other storage media. In other words, the magnetic disk device 1 has only to include the compression/extension unit 54, a first storage medium and a second storage medium. In this configuration, data transmitted from the host system 100 is transferred to the compression/extension unit 54. The compression/extension unit 54 generates headers H(1:n) and compressed packets P(1:n), and stores them in the first storage medium. At this time, the compression/extension unit 54 stores compressed packets P(1:n) and headers H(1:n) in different storage areas in the first storage medium. Subsequently, compressed packets P(1:n) are transferred from the first storage medium to the second storage medium. Headers H(1:n) in the first storage medium are processed as invalid data.

Now, this specification explains a modification example of the magnetic disk device according to the first embodiment. In the modification example of the embodiment, elements identical to those of the first embodiment are designated by the same reference numbers. Thus, the detailed description of such elements is omitted.

(Modification Example)

Figure 5:
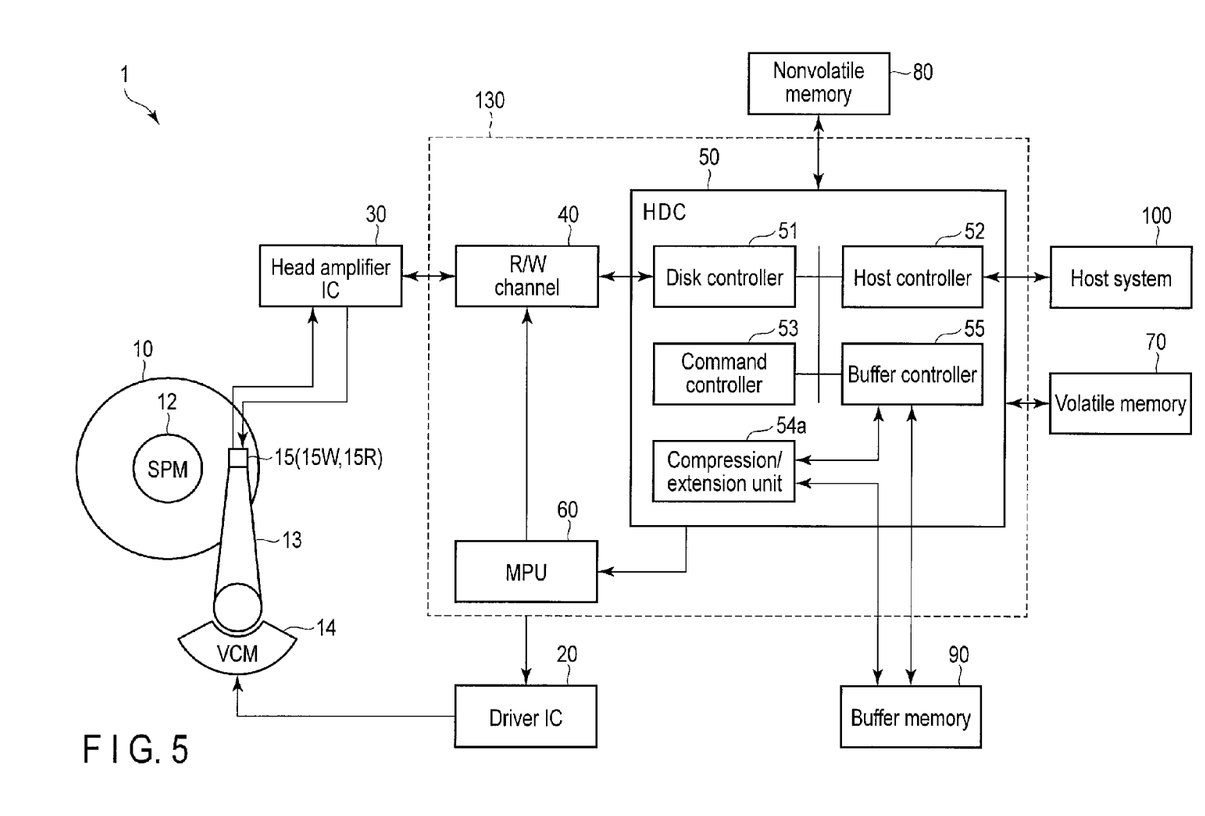
FIG. 5 is a block diagram showing a configuration of a magnetic disk device according to a modification example of the first embodiment.

The magnetic disk device 1 of the modification example of the first embodiment has a configuration which is substantially the same as that of the first embodiment. However, in the modification example, a compression/extension unit 54a of the HDC 50 is independently provided. The compression/extension unit 54a of the modification example has the same configuration as the compression/extension unit 54 of the first embodiment.

FIG. 5 is a block diagram showing a configuration of the magnetic disk device 1 according to the modification example of the first embodiment.

The compression/extension unit 54a of the HDC 50 of the modification example is not connected to the disk controller 51, the host controller 52 or the command controller 53 via a bus, etc., and thus, is independently provided. The compression/extension unit 54a is connected to each of the buffer controller 55 and the buffer memory 90. In the present embodiment, the compression/extension unit 54a accesses the buffer memory 90 and transfers compressed data, etc. The compression/extension unit 54a may access the buffer memory 90 via the buffer controller 55.

(Method for Managing Data Transferred from Host)

The HDC 50 receives data transferred from the host system 100 via the host controller 52 and stores the data in the buffer memory 90 via the buffer controller 55.

The compression/extension unit 54a accesses the buffer memory 90 at a particular timing and reads data transferred from the host system 100. The compression/extension unit 54 compresses data having a particular size and generates compressed data items S(1:n). At this time, the compression/extension unit 54a generates headers related to compressed data items S(1:n). The compression/extension unit 54a connects compressed data groups D(1:n) each including at least one compressed data S(1:n) to headers H(1:n) related to the compressed data groups, generates a compressed packet having a particular data size (for example, 4096 bytes) and stores the compressed packet in the buffer memory 90. At this time, separately from headers H(1:n) added to compressed packets P(1:n), the compression/extension unit 54a stores headers H(1:n) in the header data area 91 as well.

(Method for Managing Data Read from Disk)

When a compressed packet is written to the disk 10, the HDC 50 receives the compressed packet read from the disk 10 via the disk controller 51 and stores the compressed packet in the buffer memory 90 via the buffer controller 55.

The compression/extension unit 54a accesses the buffer memory 90 at a particular timing and reads a compressed packet read from the disk 10. The compression/extension unit 54a (controller 540) refers to data included in headers H(1:n) of the header data area 91 and determines, for example, whether or not compressed data is divided and included in different compressed packets P(1:n). The compression/extension unit 54a (controller 540) extends compressed data items S(1:n) and stores extended data items E(1:n) in the buffer memory 90.

According to the modification example, the HDC 50 includes the compression/extension unit 54a independently. Thus, the HDC 50 can arbitrarily select, compress and extend data stored in the buffer memory 90. As a result, it is possible to omit processes for compressing and extending data which is not required to be compressed or extended. Therefore, the HDC 50 can effectively perform data transfer between the host system 100 and the buffer memory 90 compared to the first embodiment.

In the above embodiment, the HDC 50 can manage compressed data which differs in the size depending on the sector.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a memory comprising a first storage area and a second storage area different from the first storage area; and
a controller circuit configured to generate a compressed data by compressing input data, generate a header data related to a compressed data group including a plurality of compressed data, generate a packet data including the header data and the compressed data group, store the packet data including the header data into the first storage area, and store the header data into the second storage area separately from the packet data.

2. The magnetic disk device of claim 1, further comprising a storage medium to store data, wherein
the controller circuit writes the packet data stored in the first storage area to the storage medium and does not write the header data stored in the second storage area to the storage medium.

3. The magnetic disk device of claim 2, wherein
the controller circuit invalidates, after the packet data is written to the storage medium, the header data which is stored in the second storage area and is related to the packet data written to the storage medium.

4. The magnetic disk device of claim 2, wherein
the controller circuit reads the packet data written to the storage medium, and
the controller circuit stores the read packet data in the first storage area and the header data included in the packet data in the second storage area.

5. The magnetic disk device of claim 1, wherein
the controller circuit generates header data including at least one of:
a first information indicating the number of data included in the compressed data group, the first information further indicating that each data is the compressed data or an uncompressed data which is uncompressed input data;
a second information indicating a start position of the top data in the compressed data group;
a third information indicating whether a divided data generated by dividing the compressed data is allocated before the top data; and
a fourth information for specifying an LBA of the compressed data.

6. The magnetic disk device of claim 5, wherein
the first information includes information indicating the number of compressed data which are sequentially arranged from the top data.

7. The magnetic disk device of claim 1, wherein the controller circuit extends the compressed data with reference to the header data.

8. A controller circuit comprising:
a compression unit configured to compress input data to generate a compressed data;
a generation unit configured to generate a header data related to a compressed data group including a plurality of compressed data; and
a control unit configured to generate a packet data including the header data and the compressed data group, and store the packet data including the header data and the header data separately from the packet data.

9. The controller circuit of claim 8, wherein
the control unit writes the stored packet data to a storage medium connected to outside, and does not write the header data which is stored separately from the packet data to the storage medium.

10. The controller circuit of claim 9, wherein
the control unit invalidates, after the packet data is written to the storage medium, the header data related to the packet data written to the storage medium.

11. The controller circuit of claim 9, wherein
the control unit reads the packet data written to the storage medium, and
the control unit stores the read packet data and the header data included in the packet data separately from the packet data.

12. The controller circuit of claim 8, wherein
the control unit generates header data including at least one of:
a first information indicating the number of data included in the compressed data group, the first information further indicating that each data is the compressed data or an uncompressed data which is uncompressed input data;
a second information indicating a start position of the top data in the compressed data group;
a third information indicating whether a divided data generated by dividing the compressed data is allocated before the top data; and
a fourth information for specifying an LBA of the compressed data.

13. The controller circuit of claim 8, further comprising an extension unit which extends the compressed data with reference to the header data.

14. A data management method comprising:
compressing input data to generate a compressed data;
generating a header data related to a compressed data group including a plurality of compressed data;
generating a packet data including the header data and the compressed data group;
storing the packet data including the header data into a first storage area; and
storing the header data into a second storage area different from the first storage area separately from the packet data.

15. The method of claim 14, further comprising:
writing the packet data stored in the first storage area to a storage medium to store data; and
not writing the header data stored in the second storage area to the storage medium.

16. The method of claim 15, further comprising
invalidating, after the packet data is written to the storage medium, the header data which is stored in the second storage area and is related to the written packet data.

17. The method of claim 15, further comprising:
reading the written packet data; and
storing the read packet data in the first storage area and the header data included in the packet data in the second storage area.

18. The method of claim 14, further comprising
generating header data including at least one of:
a first information indicating the number of data included in the compressed data group, the first information further indicating that each data is the compressed data or an uncompressed data which is uncompressed input data;
a second information indicating a start position of the top data in the compressed data group;
a third information indicating whether a divided data generated by dividing the compressed data is allocated before the top data; and
a fourth information for specifying an LBA of the compressed data.

19. The method of claim 18, wherein
the first information includes information indicating the number of compressed data which are sequentially arranged from the top data.

20. The method of claim 14, further comprising
extending the compressed data with reference to the header data.

* * * * *